(12) United States Patent
Lashley et al.

(10) Patent No.: US 7,680,795 B2
(45) Date of Patent: Mar. 16, 2010

(54) SHARED DISK CLONES

(75) Inventors: Scott David Lashley, Portland, OR (US); Karl Ostner, Wolfgang (DE); Clarence Madison Pruet, III, Flower Mound, TX (US); Jinming Xiao, Overland Park, KS (US)

(73) Assignee: International Business Machines Corporation, Armonk, NY (US)

( * ) Notice: Subject to any disclaimer, the term of this patent is extended or adjusted under 35 U.S.C. 154(b) by 319 days.

(21) Appl. No.: 11/687,494

(22) Filed: Mar. 16, 2007

(65) Prior Publication Data
US 2008/0228835 A1 Sep. 18, 2008

(51) Int. Cl.
G06F 7/00 (2006.01)
G06F 17/30 (2006.01)
G06F 12/00 (2006.01)

(52) U.S. Cl. ............................ 707/9; 707/202; 707/204
(58) Field of Classification Search .................. 707/204
See application file for complete search history.

(56) References Cited

U.S. PATENT DOCUMENTS

| | | | | |
|---|---|---|---|---|
| 5,845,292 | A * | 12/1998 | Bohannon et al. | 707/202 |
| 5,933,838 | A * | 8/1999 | Lomet | 707/202 |
| 5,940,841 | A * | 8/1999 | Schmuck et al. | 707/205 |
| 5,951,695 | A * | 9/1999 | Kolovson | 714/16 |
| 6,014,674 | A * | 1/2000 | McCargar | 707/202 |
| 6,065,018 | A * | 5/2000 | Beier et al. | 707/202 |
| 6,105,103 | A * | 8/2000 | Courtright et al. | 711/1 |
| 6,711,559 | B1 | 3/2004 | Kogota et al. | |
| 6,868,417 | B2 | 3/2005 | Kazar et al. | |
| 7,010,717 | B2 | 3/2006 | Whitlow | |
| 7,039,661 | B1 * | 5/2006 | Ranade | 707/204 |
| 7,051,173 | B2 * | 5/2006 | Tsuchiya et al. | 711/162 |
| 7,055,055 | B1 | 5/2006 | Schneider et al. | |
| 2002/0112022 | A1 | 8/2002 | Kazar et al. | |
| 2003/0041074 | A1 * | 2/2003 | Vasudevan et al. | 707/204 |

(Continued)

OTHER PUBLICATIONS

Yuanyuan Zhou, et al. "Fast Cluster Failover Using Virtual Memory-Mapped Communication,"International Conference on Supercomputing, Conference Proceedings, ACM, New York, US (Jun. 20, 1999), pp. 373-382.

(Continued)

Primary Examiner—Mohammad Ali
Assistant Examiner—Griselle Corbo
(74) Attorney, Agent, or Firm—Patterson & Sheridan, LLP

(57) ABSTRACT

Embodiments of the invention generally relate to data processing systems and more particularly to high availability data processing systems. A primary server may share a storage device with one or more clone systems. Each clone generally replicates the state of the primary server, but relies on the same disk-based storage as the primary server. Thus, the clone systems may provide a shadow of the primary server, ready to take over should the primary server fail. The clone systems may access a log file that includes entries reflecting the actions performed by the primary system. The primary server may flush entries from a log buffer maintained on the primary server to a log file stored on the shared disk-based storage. The primary server may also send a log sequence number to the clone systems, and the clone systems periodically transmit a log sequence number back to the primary server indicating how far through the log file a clone system has progressed.

27 Claims, 12 Drawing Sheets

U.S. PATENT DOCUMENTS

| | | |
|---|---|---|
| 2003/0177122 A1 | 9/2003 | Makansi et al. |
| 2003/0177206 A1 | 9/2003 | Whitlow |
| 2003/0182329 A1 | 9/2003 | Sato |
| 2003/0225760 A1 | 12/2003 | Ruuth et al. |
| 2004/0162859 A1* | 8/2004 | Guo et al. ............. 707/204 |
| 2005/0193160 A1 | 9/2005 | Bhatt et al. |
| 2005/0203908 A1 | 9/2005 | Lam et al. |
| 2005/0246401 A1 | 11/2005 | Edwards et al. |
| 2005/0246503 A1 | 11/2005 | Fair |
| 2005/0262170 A1* | 11/2005 | Girkar et al. ............. 707/204 |
| 2006/0095478 A1* | 5/2006 | Cherkauer et al. ........ 707/202 |
| 2007/0005664 A1* | 1/2007 | Kodavalla et al. ........ 707/202 |

OTHER PUBLICATIONS

Drake, et al. "Architecture of Springer-Verlag," (2004) pp. 1-16.
European Search Report & Written Opinion for PCT/EP2008/051806, Dated Dec. 10, 2008.
"2.9.8 Distributing load across several CVS servers." Oct. 2006. <http://durak.org/cvswebsites/doc/cvs_37.php>.
Matt Miller. "Optimizing Oracle through Storage Virtualization." Veritas Software, Inc.

* cited by examiner

| LSN | PAGE ACCESSED |
|---|---|
| 1 | PAGE 2 |
| 2 | PAGE 5 |
| 3 | PAGE 20 |
| 4 | PAGE 1 |
| 5 | PAGE 13 |
| 6 | PAGE 6 |
| 7 | PAGE 11 |
| 8 | PAGE 1 |
| 9 | PAGE 9 |
| 10 | PAGE 3 |
| 11 | PAGE 1 |

$230_3$ ← row 1
$230_1$ ← row 3
$230_2$ ← row 5

LOG PROCESSING ↓

FIG. 6

SHARED DISK CLONES

BACKGROUND OF THE INVENTION

1. Field of the Invention

The present invention generally relates to data processing systems, and more particularly to shared disk clones created for a high-availability database system.

2. Description of the Related Art

Large computer networks provide the necessary infrastructure for performing a variety of important functions. For example, today, databases and servers make it is possible to shop for basic consumer goods such as food and clothing over the internet by browsing websites illustrating product offerings from various vendors. As computer use becomes more pervasive, businesses offering products and services over a computer network face increasing data traffic accessing the servers configured to process consumer requests for the offered products and services. As a result, server failure or unavailability for unacceptably long periods of time may severely impact the profitability of a business.

Because availability of a computer system, for example, a server, may be crucial to customer satisfaction and profitability of a business, several solutions have been devised to increase the availability of servers and reduce the catastrophic effects of system failure. One such solution is to replicate the computer and storage systems to provide redundancy. For example, a primary server system may be configured to receive and process requests received over a network from multiple client systems. To process the requests, the primary server system may access a database located in the primary server system and/or a first memory device associated with the primary server system.

A copy of the database accessed by the primary server system may be maintained at a secondary server system and/or a second memory device associated with the secondary server system. To maintain an accurate version of the database on the secondary computer system, the primary server system may be configured to communicate with the secondary server system so that the secondary server system performs the same sequence of operations performed by the primary server system. Therefore, if the primary server system fails, the secondary server system may continue to process requests without interrupting service.

One problem with the solution described above is that a large number of resources may be necessary to implement such a solution. For example, replication requires that the secondary server system have access to at least the same amount of disk storage as the primary server system to maintain an accurate and up to date copy of the database. In applications that require large amounts of disk storage, providing such redundant capacity may become cost prohibitive.

Yet another problem is that a tight relationship must be maintained between the primary server system and the secondary server system to ensure that the secondary server system synchronously performs operations in conjunction with the primary server system. In some instances, for example, in government and military applications, it may be necessary to maintain two or more secondary server systems to provide adequate backup in case a double failure occurs. Further, the backup systems are frequently located at physically distinct locations from the primary server. However, the communication between a primary server system and a tightly-coupled secondary server system may introduce unacceptable latencies, thereby making the computer system unavailable for use.

Accordingly, there is a need for methods and systems for providing an improved high availability computer system that utilizes resources more efficiently and is capable of implementing multiple back up systems without affecting performance.

SUMMARY OF THE INVENTION

Embodiments of the invention include a method for a shared disk clone to shadow database processing actions performed by a primary database server having access to a shared storage device. The method generally includes sharing access from the primary database server and the shared disk clone to database pages stored on the shared storage device and access to a log file that stores entries corresponding to a sequence of database processing actions performed by the primary database server. The method also includes receiving a first log sequence number (LSN) representing an entry in the sequence of database processing actions, reading the log file to retrieve the log entries in the log file sequentially prior to the entry represented by the first LSN, and performing at least some of the sequence of database processing actions specified by the log entries. Performing the database actions includes retrieving at least one database page from the database pages. The method also includes storing the at least one database page in a page buffer on the shared disk clone and sending a message to the primary database server that includes a second LSN specifying a last log entry processed by the shared disk clone. The primary database server may be configured to flush pages from a page buffer on the primary database server to the shared storage device based upon how far the shared disk clone as progressed through the sequence of database processing actions specified by the log entries.

In the event that the primary database server fails, the method may also include promoting the shared disk clone to replace the primary database server.

Embodiments of the invention also include a computer-readable storage medium containing a program which, when executed, performs an operation for a shared disk clone to shadow database processing actions performed by a primary database server having access to a shared storage device. The operation generally includes sharing access from the primary database server and the shared disk clone to database pages stored on the shared storage device and access to a log file that stores entries corresponding to a sequence of database processing actions performed by the primary database server. The operation also includes receiving a first log sequence number (LSN) representing an entry in the sequence of database processing actions, reading the log file to retrieve the log entries in the log file sequentially prior to the entry represented by the first LSN, and performing at least some of the sequence of database processing actions specified by the log entries, wherein the performing includes retrieving at least one database page from the database pages. The operation also includes storing the at least one database page in a page buffer on the shared disk clone and sending a message to the primary database server that includes a second LSN specifying a last log entry processed by the shared disk clone. The primary database server may be configured to flush pages from a page buffer on the primary database server to the shared storage device based upon how far the shared disk clone as progressed through the sequence of database processing actions specified by the log entries.

Embodiments also include a computing device having a processor, a shared storage device, and a memory containing a program, which when executed on the processor, performs an operation for a shared disk clone to shadow database processing actions performed by a primary database server having access to a shared storage device. The operation generally includes sharing access from the primary database server and the shared disk clone to database pages stored on the shared storage device and access to a log file that stores entries corresponding to a sequence of database processing actions performed by the primary database server. The operation also includes receiving a first log sequence number (LSN) representing an entry in the sequence of database processing actions, reading the log file to retrieve the log entries in the log file sequentially prior to the entry represented by the first LSN, and performing at least some of the sequence of database processing actions specified by the log entries, wherein the performing includes retrieving at least one database page from the database pages. The operation also includes storing the at least one database page in a page buffer on the shared disk clone and sending a message to the primary database server that includes a second LSN specifying a last log entry processed by the shared disk clone. The primary database server may be configured to flush pages from a page buffer on the primary database server to the shared storage device based upon how far the shared disk clone as progressed through the sequence of database processing actions specified by the log entries.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 6 illustrates an exemplary log file, according to an embodiment of the invention.

DETAILED DESCRIPTION OF THE PREFERRED EMBODIMENTS

Figure 1:
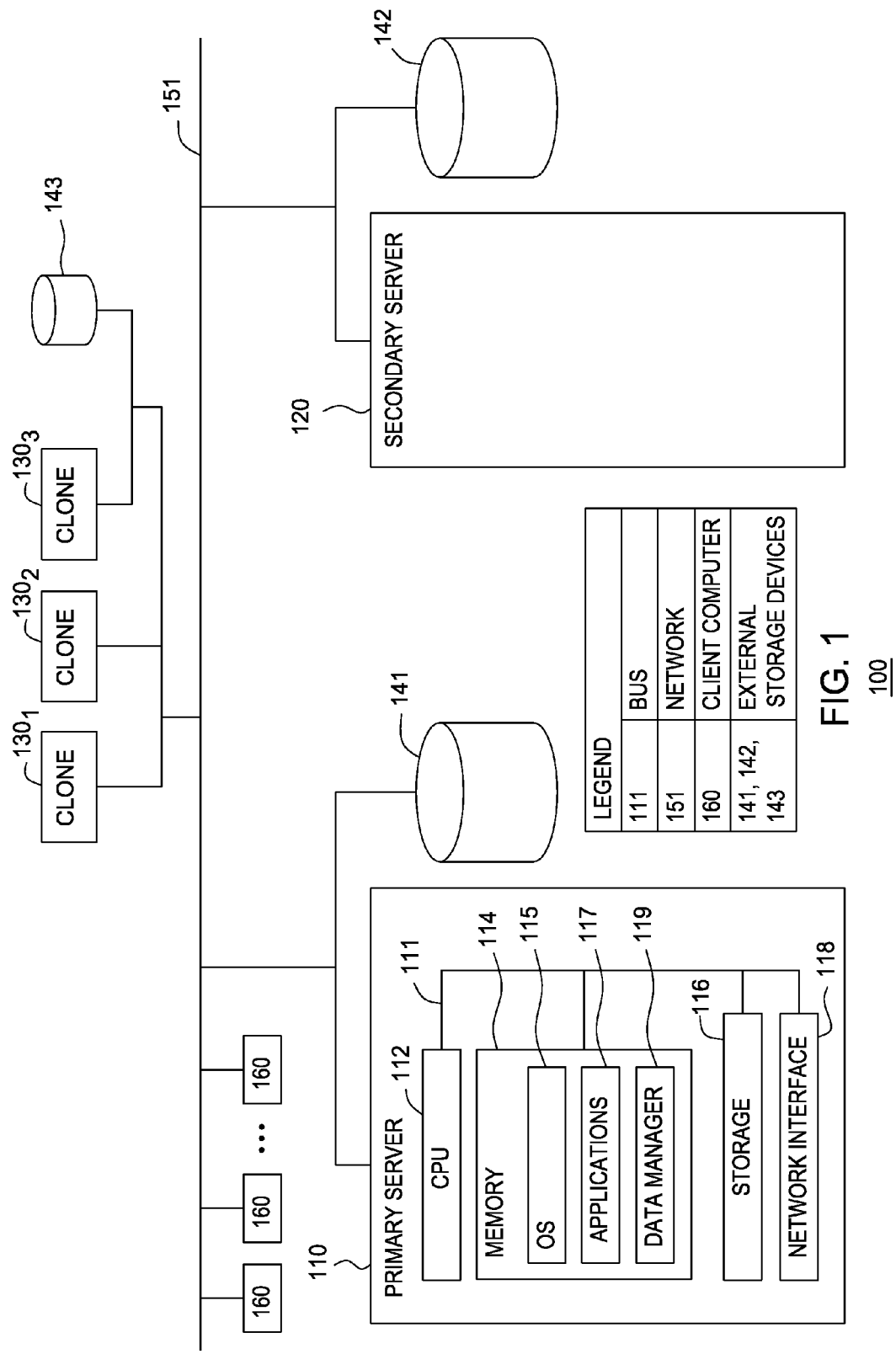
FIG. 1 illustrates an exemplary system, according to an embodiment of the invention.

Embodiments of the present invention generally relate to data processing systems, and more particularly to high availability data processing systems. In one embodiment, a primary server may share a storage device with one or more clone systems. Each clone generally replicates the state of the primary server, but relies on the same disk-based storage as the primary server. Thus, the clone systems may provide a shadow of the primary server, ready to take over should the primary server fail. In one embodiment, the clone systems may access a log file that includes entries reflecting the actions performed by the primary system. The primary server may flush entries from a log buffer maintained on the primary server to a log file stored on the shared disk-based storage. The primary server may also send a log sequence number to the clone systems, and the clone systems periodically transmit a log sequence number back to the primary server indicating how far through the log an individual clone has progressed.

Additionally, a clone system may operate in a "recovery mode" where the clone system processes entries from the log file, essentially performing the same actions as the primary system, and maintaining a local cache of pages pulled form from the shared disk-based storage as log entries are processed. Because the clone accesses the same disk-based storage, the primary server may monitor how far through the log the clone has progressed before writing pages to the disk-based storage. Doing so prevents the primary server from writing a page to the shared disk-based storage when the clone still needs to pull that page from the shared disk-based storage as part of processing log entries.

In another embodiment, the primary server may be coupled with one or more clone computers having their own disk-based storage. The primary server may ship the pages from a log buffer the clone systems for processing. The processing of the log file by the clone computers may lag behind processing of the log file by the primary server, but may provide an essentially complete backup of the primary server, without disrupting the operations of the primary server.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable media. Illustrative computer-readable media include, but are not limited to: (i) non-writable storage media (e.g., read-only memory devices within a computer such as CD-ROM or DVD-ROM disks readable by a CD- or DVD-ROM drive) on which information is permanently stored; (ii) writable storage media (e.g., floppy disks within a diskette drive or hard-disk drive) on which alterable information is stored. Such media may be generally referred to as computer readable storage media. Other media include communications media through which information is conveyed to a computer, such as through a computer or telephone network, including wireless communications networks. The latter embodiment specifically includes transmitting information to/from the Internet and other networks. Such computer-readable media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 illustrates an exemplary system 100 according to an embodiment of the invention. As illustrated, system 100 may include a primary server computer 110, a secondary server computer 120, one or more shared disk clones 130 (or just clones, for short), and one or more client computers 160. The primary server computer 110, secondary server computer 120, one or more clone servers 130, and one or more client computers 160 are connected via a network 151. In general, the network 151 may be a local area network (LAN) and/or a wide area network (WAN). In a particular embodiment, the network 151 is the Internet.

Primary server computer 110 may include a Central Processing Unit (CPU) connected via a bus 111 to a memory 114, local storage 116, and network interface device 118. The network interface device 118 may be any device configured to allow network communications between the primary server 110 and any other device connected to network 151, for example, secondary server 120 and/or a clone 130.

Storage 116 is preferably a Direct Access Storage Device (DASD). Although it is shown as a single unit, it could be a combination of fixed and/or removable storage devices, such as fixed disc drives, floppy disc drives, tape drives, removable memory cards, or optical storage. The memory 114 and storage 116 could be part of one virtual address space spanning multiple primary and secondary storage devices.

The memory 114 is preferably a random access memory sufficiently large to hold the necessary programming and data structures of the invention. While memory 114 is shown as a single entity, it should be understood that memory 114 may in fact comprise a plurality of modules, and that memory 114 may exist at multiple levels, from high speed registers and caches to lower speed but larger DRAM chips.

Memory 114 may contain an operating system 115, applications 117, and a data manager program 119. Illustrative operating systems 115, which may be used include the i5/OS® available from IBM, a distribution of the Linux® operating system (Linux is a trade mark of Linus Torvalds in the US and other countries) and versions of the Microsoft's Windows® operating system. More generally, any operating system supporting the functions disclosed herein may be used.

Applications 117 may be software products comprising a plurality of instructions that are resident at various times in various memory and storage devices in the system 100. When read and executed by CPU 112, the applications 117 may cause the system 100 to perform the steps or elements embodying the various aspects of the invention. For example, in one embodiment, a client computer 160 may be configured to issue requests for service to the primary server 110. The request may include, for example, a request to launch an application 117, or a query to a database managed by the primary server 110. For example, the client computer 160 may include a graphical user interface (GUI) program to issue requests to the primary server 110 and display data received from the primary server 110.

As described above, client requests for service may access a database managed by the primary server 110. The database managed by the primary server 110 may be contained in a local storage device 116 and/or an external storage device 141 associated with the primary server 110. For example, in one embodiment, the database may be stored in the external storage device 141 and storage device 116 may serve as a cache to store a portion of the database associated with requests from a client computer 160. In such a case, the database application running on the primary server may pull pages from the database on storage 141 and store then locally in a cache in storage 116. Periodically, e.g., when the cache is full, or when a page is no longer needed, pages may be flushed back to storage 141. In one embodiment, storage 141 is a storage area network (SAN). As is known, a SAN provides network of storage disks and may be used to connect multiple servers (e.g., primary server 110 and clones 130) to a centralized pool of disk storage.

Data manager 119 may be configured to communicate with secondary server 120 and/or clone 130. For example, data manager 119 may maintain a log file of all events occurring on primary server 110. Data manager 119 may transfer at least a portion of the log file to the storage device 141 where it is accessed by clone 130 for processing. As described in greater detail below, the log file may include a sequence of entries representing the actions performed by the database system running on primary server 110. By performing the same sequence of actions contained in the log, secondary server 120 and clone 130 maintain a ready backup state. Thus, if primary server 120 should fail, secondary server 120 may take over. Similarly, in a system without secondary server 120, the clones 130 may be promoted from a shared disk clone 130 to status as primary server 110.

The secondary server 120 and shared disk clones 130 may be arranged in a manner similar to primary server 110. Accordingly, secondary server 120 and clone computers 130 may each include a CPU 112, memory 114, operating system 115, applications 117, data manager 119, storage 116, network interface 118, and the like (not shown).

In one embodiment, secondary server 120 may be configured to operate in a "recovery mode." While in recovery mode, secondary server 120 may perform the sequence of actions specified in log events written to a log file by the primary server 110. A relatively tight relationship may be maintained between the primary server 110 and secondary server 120. For example, the primary server may transfer a log file comprising events that occur at the primary server 110 to the secondary server 120. The primary server 110 may periodically check on the status of log processing on the secondary server 120 to ensure synchronous processing. The primary server may determine whether the secondary server 120 has performed the actions specified in the most recent log entries. That is, the primary server may periodically determine whether the backend server needs to "catch-up" with the primary server 11. For example, in one embodiment, primary server 110 may set checkpoints in a log file to synchronize processing of a log file with the secondary server. Therefore, if the primary server becomes unavailable, the secondary server 120 may provide a backup system with a current state of the database.

In one embodiment, the secondary server 120 may also provide load balancing for system 100 by processing requests to read a database maintained by the secondary server 120. For example, the primary server 110 and secondary server 120 may be web servers configured to display data on a graphical user interface screen. Requests for data may be received and processed by the secondary server 120 to achieve load balancing between the primary server 110 and secondary server 120. In one embodiment, while secondary server 120 may be configured to read its own copy of the database, the secondary server may not be permitted to alter the copy of the database in order to maintain consistency with the primary server 110.

In one embodiment, secondary server 120 may have at least the same amount of memory and a similar disk layout as primary server 110. For example, secondary server 120 may include a similar memory and storage capacity. Secondary server 120 may also have an associated external storage device 142 having at least the same amount of storage space as the external storage device 141.

In one embodiment, clone 130 may share a storage device, for example, external storage device 141, with the primary computer 110 to obviate the need for redundant storage. For example, clones $130_1$ and $130_2$ may share the external storage device 141 with the primary server 110. In some cases, the primary server 110 may require a large amount of storage space; therefore, providing redundant storage at a secondary server 120 may not be economically feasible. Embodiments of the invention address this (and other) situations by using one or more shared disk clones 130. Each shared disk clone 130 may provide a complete operational and functional copy of primary server 110; however, each shared disk clone 130 may be configured to access the same disk storage used by primary server 110 (e.g., storage 141 configured as a SAN). In one embodiment, primary server 110 may transfer a portion of the log file to storage 141. Like secondary server 120, shared disk clones 130 may operate in recovery mode. Thus, each of the clones 130 may actively perform actions first performed by the primary server 110 (as recited in a set of log entries). Because the clones 130 repeat actions performed on the primary server 110 after they are written to the log file, the operational state of clone computer 130 may lag slightly behind that of the primary server 110.

In another embodiment, a clone computer 130 may have its own storage for maintaining a copy of the database operated on by a primary server 110. For example, clone computer $130_3$ is shown having an associated external storage device 143. Clone computer $130_3$ is referred to herein as a High-Availability Data Replication (HDR) clone. The functionality of primary server 110 and HDR clone system $130_3$ communicate used to achieve high data availability and redundancy is described in greater detail below in conjunction with FIGS. 11 and 12.

One skilled in the art will recognize that the various components of exemplary system 100 are shown only for illustrative purposes and that embodiments of the invention may include any combination of the components described therein. For example, one embodiment of the invention may include a primary server 110 coupled one or more shared disk clones $130_1$ and $130_2$ and external storage device 141 over the network 151. Another embodiment may comprise a primary server 110 coupled with a secondary server 120, HDR clone $130_3$, and the associated external storage devices 141, 142, and 143 connected over the network 151. In yet another embodiment, the primary server 110 may be coupled with one or more shared disk clones and/or one or more HDR clones without including a secondary server 120. Other permutations or combinations may be adapted to suit the needs of a particular case.

Figure 2:
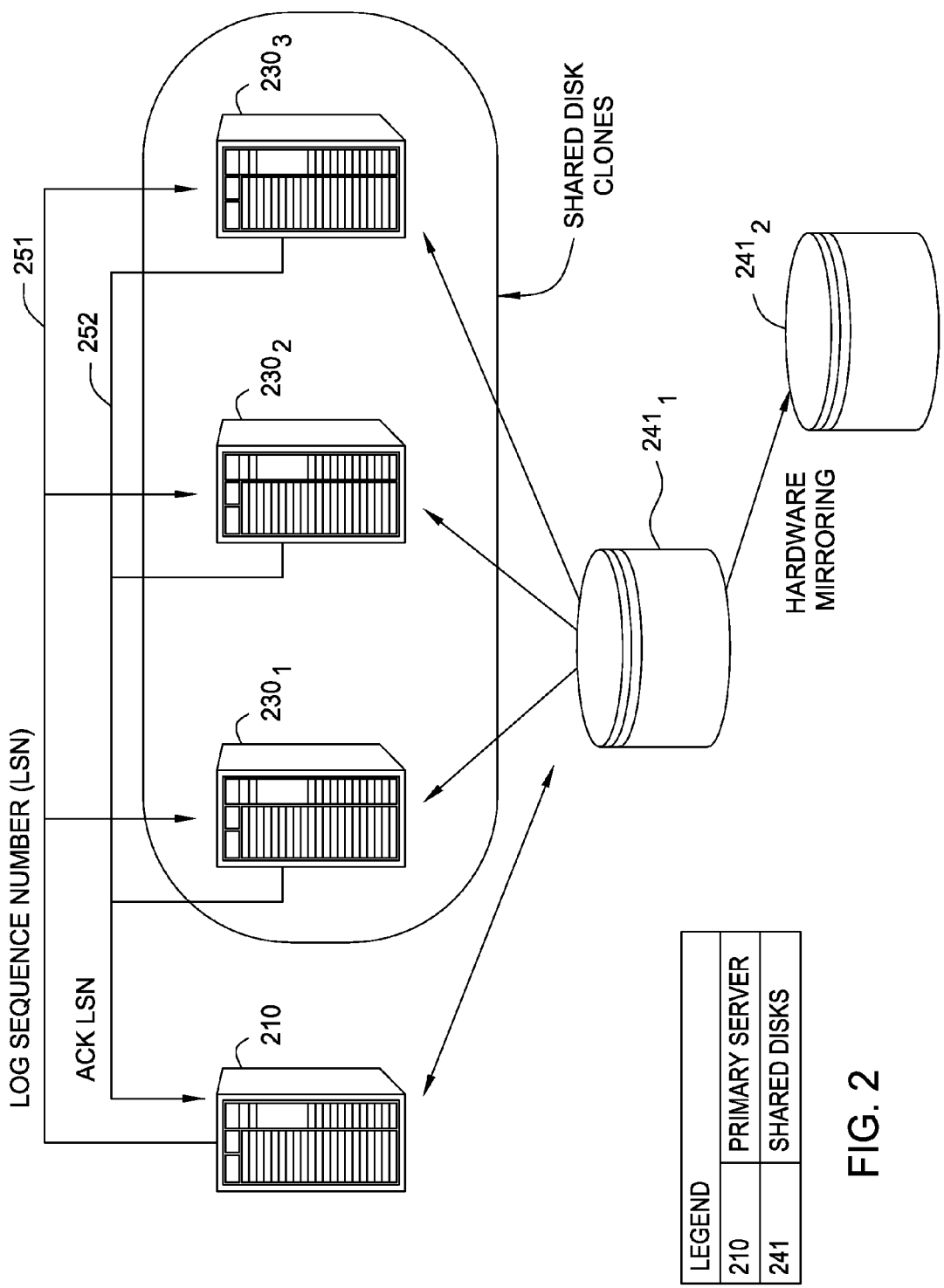
FIG. 2 illustrates an exemplary system that includes multiple shared disk clones, according to an embodiment of the invention.

FIG. 2 illustrates an exemplary system 200, according to one embodiment of the invention. As shown, system 200 includes a primary server 210, shared disks 241, and shared disk clones 230 (or just clones, for short). Specifically, FIG. 2 illustrates three shared disk clones $230_1$, $230_2$, and $230_3$. Primary server 210, shared disk clones 230, and shared disks 241 generally correspond to primary server 110, shared disk clones $130_1$ and $130_2$, and storage device 141 shown in FIG. 1.

As described above, shared disk clones 230 may be configured to operate in recovery mode. In other words, shared disk clones 230 may perform the same events that occur at the primary server 210 (as reflected by entries in a log file) to provide a backup in case a failure occurs at the primary server 210. Primary server 210 may be configured to store the log file in the storage provided by shared disks 241. Shared disk clones 230 may retrieve and process portions of the log file from a shared disk 241. As events are written to the log file by primary server 110, shared disk clones 230 may retrieve portions of the log file and repeat the events reflected therein.

In one embodiment, the primary server 210 may be configured to perform both read and write operations on a shared disk 241. However, shared disk clones 230 may be limited to performing only read operations on the shared disk 241. Additionally, the primary server 210 and the shared disk clone 230 coordinate with one another concerning when data can be read from the shared disk 241 and when dirty pages can be flushed. For example, when the primary server 210 reads a page from the shared disk 241, that page may be stored in a cache accessible by the primary server 210. Further, while cached, the primary server 210 may write to the page (i.e., dirty) while it is in the cache. Eventually, the cache is flushed and the dirty page is written back to the shared disk 241. However, if the page is flushed before a shared disk clone 230 processes the log entry and pulls that same page from shared disk 241, when that shared disk clone 230 eventually reaches that point in the log, it no longer retrieves a page that can be used to replicate the operations of the primary server 210. Accordingly, the primary server 210 may be configured to notify the shared disk clones 230 when they should read the log file, and the shared disk clones 230 may be configured to notify the primary server 210 as they advance through the entries in the log. By tracking how far the shared disk clones 230 have advanced through the log file, the primary server 210 may determine whether it is safe to flush a dirty page. Usually, the primary server 210 should not flush a dirty page until all of the clones 230 have reached the log entry pulling the prior image of that page from the shared disks 241. By tracking which log operation first dirties a page, the primary server 210 can determine whether each of the shared disk clones 230 have read that page into their own buffer caches by referencing the log sequence numbers (LSN) from the clones.

In one embodiment, the shared disk 241 may be duplicated to provide hardware mirroring. FIG. 2 shows two shared disks $241_1$ and $241_2$. Shared disk $241_2$ may be a mirrored copy of shared disk $241_1$. In other words, an exact copy of a database on shared disk $241_1$ is also maintained in shared disk $241_2$. Primary server 210 may be configured to automatically update both shared disks 241 when updating the database. If a disk failure occurs on any one shared disk 241, primary server 210 and shared disk clones 230 may be configured to automatically access the mirrored shared disk. For example, if shared disk $241_1$ fails, the primary server 210 and the shared disk clones 230 may be configured to access shared disk $241_2$. Alternatively, hardware mirroring techniques such as a RAID array may be used. In such a case, any disk failures should be generally transparent to the operations of primary server 210 and shared disk clones 230.

While FIG. 2 shows two mirrored shared disks $241_1$ and $241_2$, and three shared disk clones $230_1$, $230_2$, and $230_3$, one skilled in the art will recognize that any number of mirrored disks 241 and shared disk clones 230 may be implemented without departing from the scope of the invention. Furthermore, the number of shared disk clones 230 may vary over time. For example, one or more shared disk clones 230 may be either added or removed from the system during the course of operation.

Figure 3:
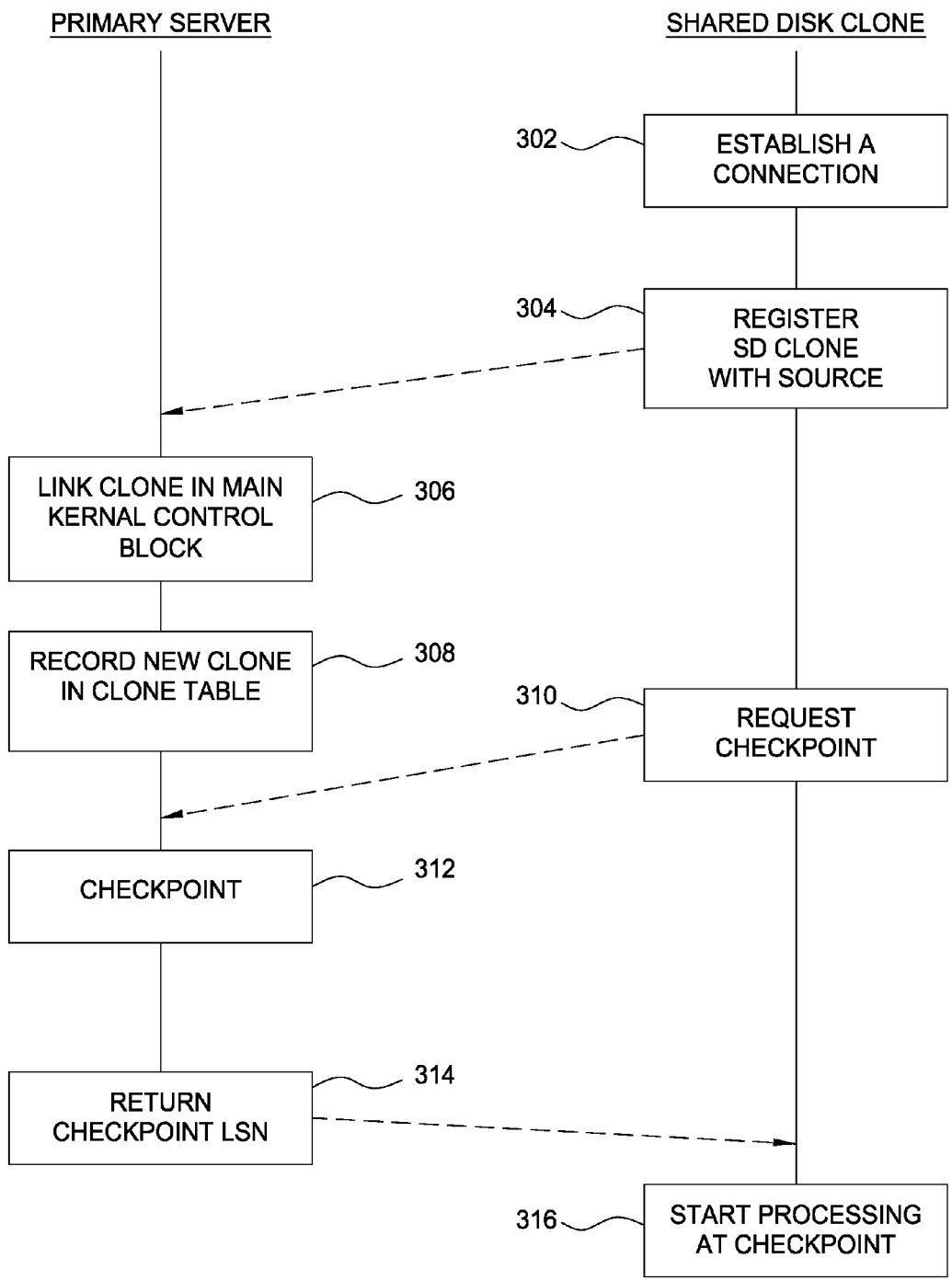
FIG. 3 illustrates exemplary operations performed to initiate a shared disk clone, according to an embodiment of the invention.

FIG. 3 illustrates a flow diagram of exemplary operations for initiating a shared disk clone 230 in a system 200. As shown, the operations begin at step 302, where a shared disk clone 230 establishes a connection with a primary server 210. For example, in one embodiment, the shared disk clone 230 may use a Trusted Server Group Connection (TSGC) network interface to establish a connection with a primary server 210. TSGC may provide a trusted multiplexer network connection between servers which may make it relatively easy to dynamically establish a logical connection between functions or applications residing on either side of the connection. Of course, other network connection methods may be used.

At step 304, the shared disk clone 230 may register itself with the primary server 210. For example, the shared disk clone 230 may send location and identification data to register itself with the primary server 210. At step 306, the primary server 210 may receive the registration data from the shared disk clone 230. In response, the primary server 210 may create a new clone control block for the shared disk clone in a main kernel control block of the primary server 210. The main kernel control block and the clone control blocks may be a part of the data manager 119 illustrated in FIG. 1. At step 308, primary server 210 may record the new shared disk clone data in a clone table.

At step 310, the new shared disk clone may issue a request for a checkpoint to the primary server 210. As is known, when a checkpoint occurs, the primary database server 210 writes all dirty pages back to the shared disk 241. In the context of the present invention, for example, the primary server 210 may retrieve pages from shared disk 241 and perform various database operations with the records in the retrieved pages. Initially, the changes are performed using the copy of the pages stored locally on primary server 210, and the actions are logged to the log file. However, until the pages are written to the shared disk 241, shared disk clones 230 cannot access the same pages from the storage array 141 (or can only access "incorrect" data) from storage array 141. Accordingly, the primary server periodically, writes any modified pages back to the primary storage and issues a checkpoint. Checkpoints are frequently used for synchronizing operations, rolling back operations that fail to complete, or restoring a system after a crash. In one embodiment, the primary server 210 may respond by identifying the most recent hard-blocking checkpoint in the log file, and, at step 312 sending this checkpoint to the shared disk clone. The hard-blocking checkpoint forces the primary server to block (i.e., prevent any updating activity to records of the primary database server) until the clone "catches up" to the hard-blocking checkpoint. When processing of the checkpoint is completed, primary server 210 may send the checkpoint LSN to the new shared disk clone, in step 314. At step 316, the new shared disk clone may start processing the log file at the checkpoint. In other words, the shared disk clone enters into a recovery mode and begins performing actions in stored in the log subsequent to the LSN of the checkpoint.

As discussed above, each shared disk clone 230 may process a log file that records the sequence actions carried out by primary server 210. In one embodiment, the log file may be stored on shared disk 241. Primary server 210 and shared disk clones 230 may access the log file in the shared disk 241 and process the events contained therein.

Figure 4:
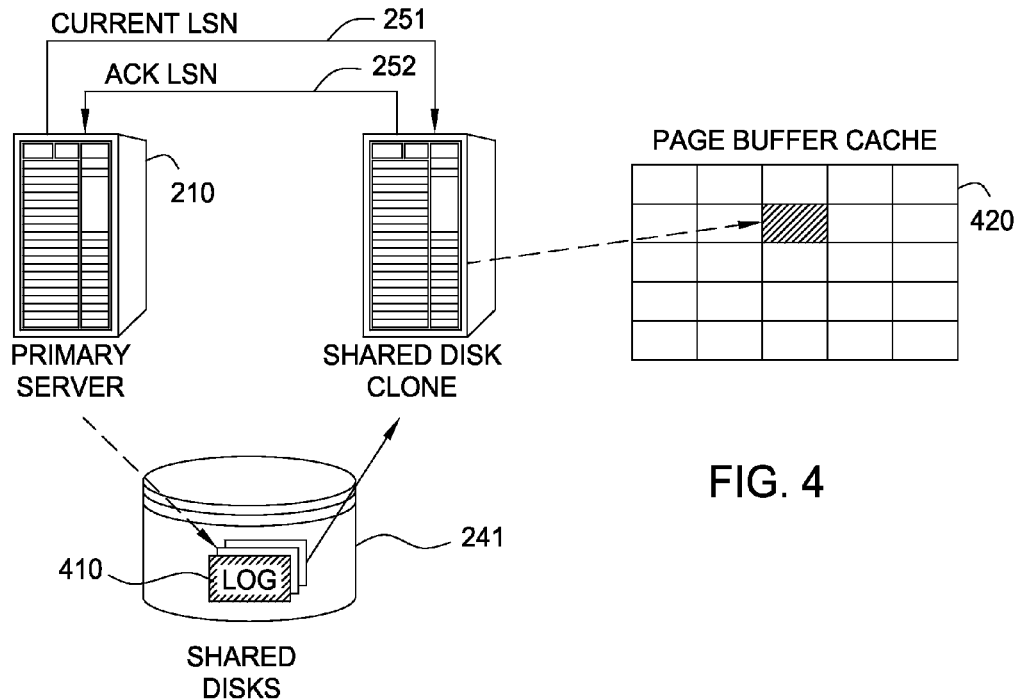
FIG. 4 is a conceptual illustration of log processing performed by a shared disk clone, according to an embodiment of the invention.

FIG. 4 illustrates exemplary processing of a log file stored in a shared disk 241 by a shared disk clone 430, according to an embodiment of the invention. As illustrated, primary server 210 may flush a set of log events from a cache on the primary server 210 into the log file 410 stored on shared disk 241. After flushing a log file 410 to the shared disk 241, primary server 210 may notify each shared disk clone 230 that a log flush has occurred and a value for the current LSN. The LSN 251 indicates how far the shared disk clone 230 may read into the log file. In response, shared disk clone 230 reads the log file 410 in the shared disk 241 up to the LSN 251 received from the primary server 210. In the event of multiple shared disck clones 230, each shared disk clone 230 may read the log events from log 410 up to the LSN 251.

The shared disk clone (or clones) 230 may then process events listed in the log file 410 retrieved from the shared disk 241. While processing log events, the shared disk clones 230 may retrieve pages from the shared disk 241 and perform the database operations using records from the retrieved pages. The events themselves are specified by the log entries. Additionally, in one embodiment, each shared disk clone 230 may store pages retrieved from the shared disk 241 in a page buffer cache 420 at the shared disk clone 230. As shared disk clone 230 processes log events, it may periodically send an acknowledgement message 252 to the primary server 210 indicating the LSN of the last log event processed by that clone 230.

As stated, by monitoring the status of log processing across the shared disk clones 230, a primary server may determine whether it is safe to flush a dirty page to the shared disk 241. For example, the primary server 210 may also maintain a page buffer cache of data processed by the primary server 210. By monitoring the progress of log file processing in the shared disk clones 230, the primary server 210 may determine whether a page dirtied by the primary server 210 has been read by the shared disk clones 230. If the page has been read by all the shared disk clones 230, primary server 210 may determine that it is safe to flush the dirty page to the shared disk 241. Dirty page flushing by the primary server 210 is discussed in greater detail in the following section.

Figure 5:
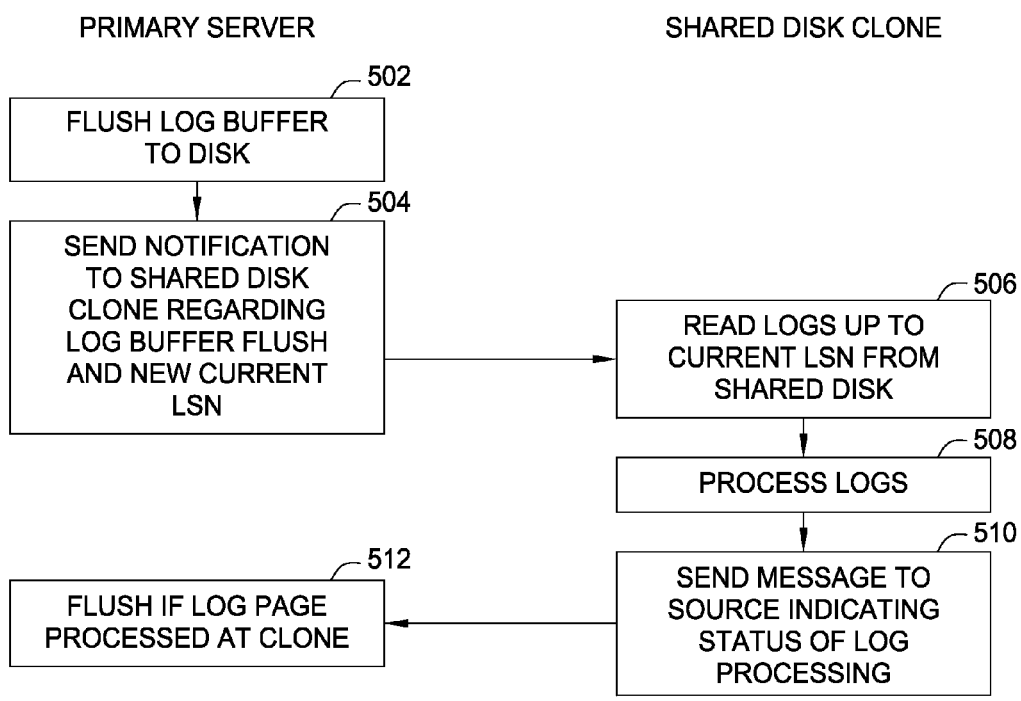
FIG. 5 is a flow diagram of exemplary operations performed by a primary server and shared disk clone during log processing, according to an embodiment of the invention.

FIG. 5 illustrates a flow diagram of exemplary operations performed by a primary server 210 and a shared disk clone 230 during normal log file processing. The operations may begin in step 502 where the primary server flushes a log file 410 to a shared disk 241. In step 504, the primary server 210 may send a notification to the shared disk clones 230 indicating availability of a newly flushed log file in the shared disk 241. For example, primary server 210 may send an LSN 251 to the shared disk clones 230 indicating how far into a log file a shared disk clone 230 may read.

In step 506, each shared disk clone 230 may read the log file from the shared disk 241 up to the LSN 251. In step 508, the shared disk clones may process the entries in the log file retrieved from the shared disk 241. In step 510, each shared disk clone 230 may send an acknowledgement message 252 to the primary server 210 indicating a log sequence number of the last log entry processed by that shared disk clone.

By determining the progress of processing of the log file in the shared disk clones 230 using the acknowledgement message 252, primary server 210 may determine whether it is safe to flush a dirty page to the shared disk. For example, if a page has been read by all the shared disk clones, primary server 210 may flush the page to the shared disk in step 512.

As discussed earlier, primary server 210 should not flush a dirty page shared disk 241 until shared disk clones 230 have processed the log entry pulling that same page from shared disk 241. Doing so allows the shared disk clones 230 to access the same version of that page accessed by the primary server 210. And therefore, maintain consistency in processing across the primary server 210 and the shared disk clones 230.

FIG. 6 illustrates a sequence of log entries in which pages may be processed by the shared disk clones 230 by accessing the log file. As shown, table 600 includes a column 610 storing a log sequence number (LSN). Table 600 also includes a column 620 indicating which page(s) are affected by that log entry. Table 600 may include a portion of the log file 410 read by the shared disk clones 230. For example, primary server 210 may send a message indicating an LSN value of 11. In response to receiving the LSN value, the shared disk clones 230 may read the log file up to that LSN value.

As the shared disk clones 230 are in recovery mode, each one is performing the actions specified by prior log entries. Also, while processing a log event, a shared disk clone 230 may read pages stored on shared disk 241. The pages accessed by the shared disk clone 230 may be stored in a page buffer on the shared disk clone. The shared disk clone 230 may alter pages while processing log entries.

Because the primary server 210 may alter a page as part of ongoing database operations, it may be configured to stall flushing pages from a cache on the primary server 210 back to the shared disk 241 until the clones 230 have read that page from the shared disk 241. For example, with reference to FIG. 6, the entry represented by LSN 4 indicates to pull page 1 form shared disk 241. As shown, the LSN for clone $232_2$ is currently 5, indicating that clone $232_2$ has already performed the action represented by LSN 4, and already pulled page 1 from shared disk 241. However, neither clone $232_1$ nor clone $232_3$ has reached the entry log represented by LSN 4. Accordingly, the primary server 210 may be configured to stall flushing page 1 to the shared disk 241 until $232_1$ or clone $232_3$ have send a message to primary server 210 indicating that they have processed this log entry. For example, the shared disk clones 230 may send periodic acknowledgement messages 252 the current LSN processed by each of shared disk clones 230.

Continuing through the log sequence illustrated in FIG. 6, page 1 is again accessed by the actions of LSN=8 and LSN=11. In one embodiment, primary server 210 need not wait till all shared disk clones 230 have accessed Page 1 during processing of LSN=11 because Page 1 may have already been read and buffered in a page buffer at the shared disk clones during processing of LSN=4. Therefore, Primary server 210 may flush page 1 to the shared disk 241 after all shared disk clones 230 access a particular page for the first time, for example, during LSN=4 processing for page 1.

Figure 7:
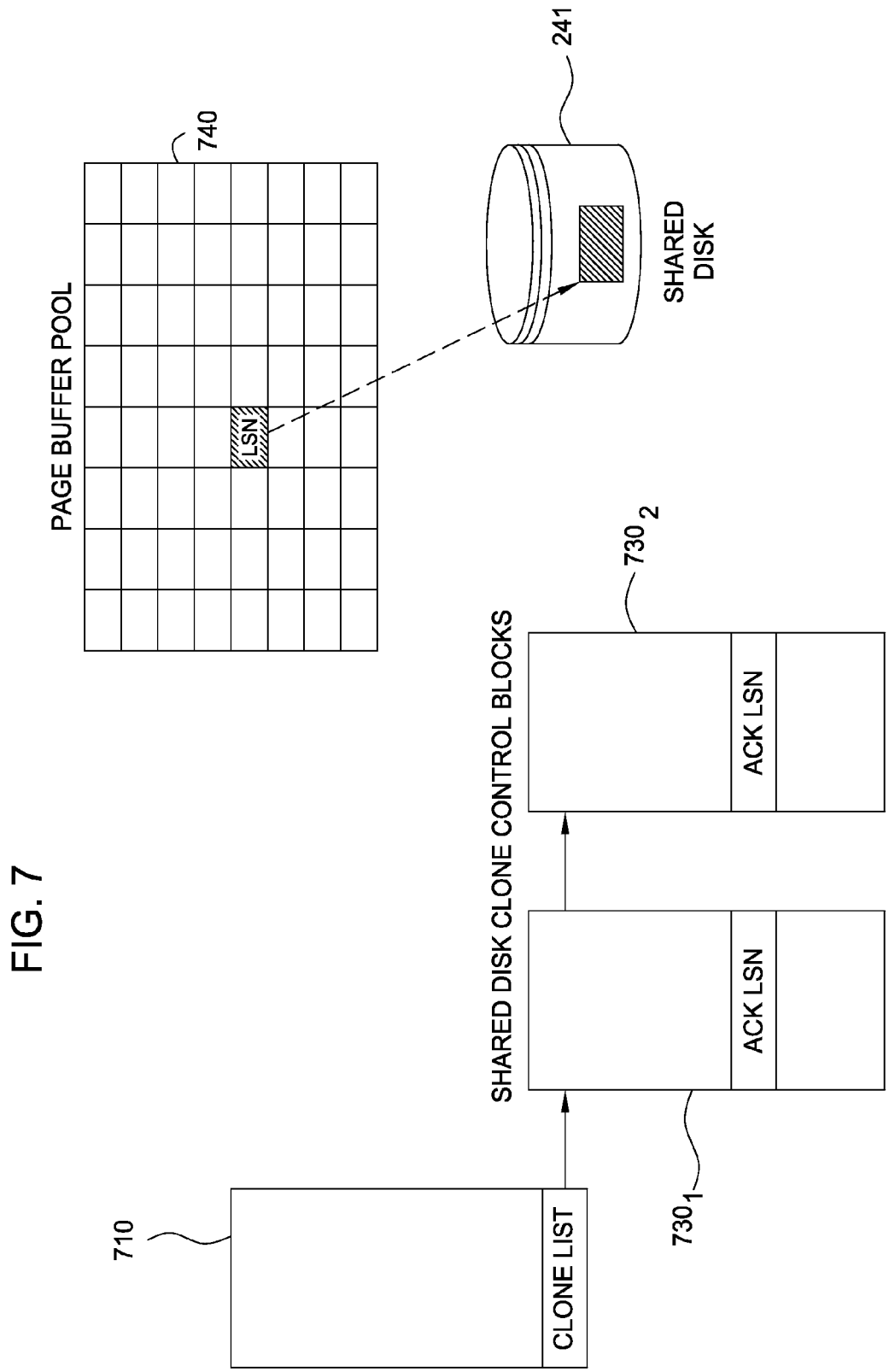
FIG. 7 is a conceptual illustration of log flushing, according to an embodiment of the invention.

FIG. 7 illustrates exemplary components of primary server 210 used to track log processing by the shared disk clones 230. As shown, primary server 210 includes a main kernel control block 710. Main kernel control block 710 may include a list 720 of shared disk clones 230 associated with the primary server 210. The clone list 720 may include a clone control block 730 for each shared disk clone 230. For example, two clone control blocks $730_1$ and $730_2$ are illustrated. Each clone control block 730 may include the LSN from the most recent acknowledgement message 252 sent by the shared disk clone 230 associated with that control block.

Primary server 210 may also include a page buffer pool 740. Page buffer pool 740 may include pages read and cached by the primary server 210 from shared disk 241. The pages in the page buffer pool 740 may have been modified by the operations of primary server 210. Primary server 210 may mark each page with the first LSN value that updates the page. For example, referring back to FIG. 6, Page 1 may be marked with LSN=4 because it is first modified by that LSN value.

During normal processing, primary server 210 may examine the clone control blocks to determine the lowest LSN value acknowledged by the shared disk clones 230. If the lowest LSN value acknowledged is less than an LSN value marking a page, that page may not be flushed because not all of the shared disk clones have accessed that page. For example, referring back to FIG. 6, the lowest LSN value acknowledged is LSN=1 (by shared disk clone $230_3$). Because the lowest LSN value acknowledged (LSN=1) is less than the LSN value marking page 1 (LSN=4), Page 1 may not be flushed.

Figure 8:
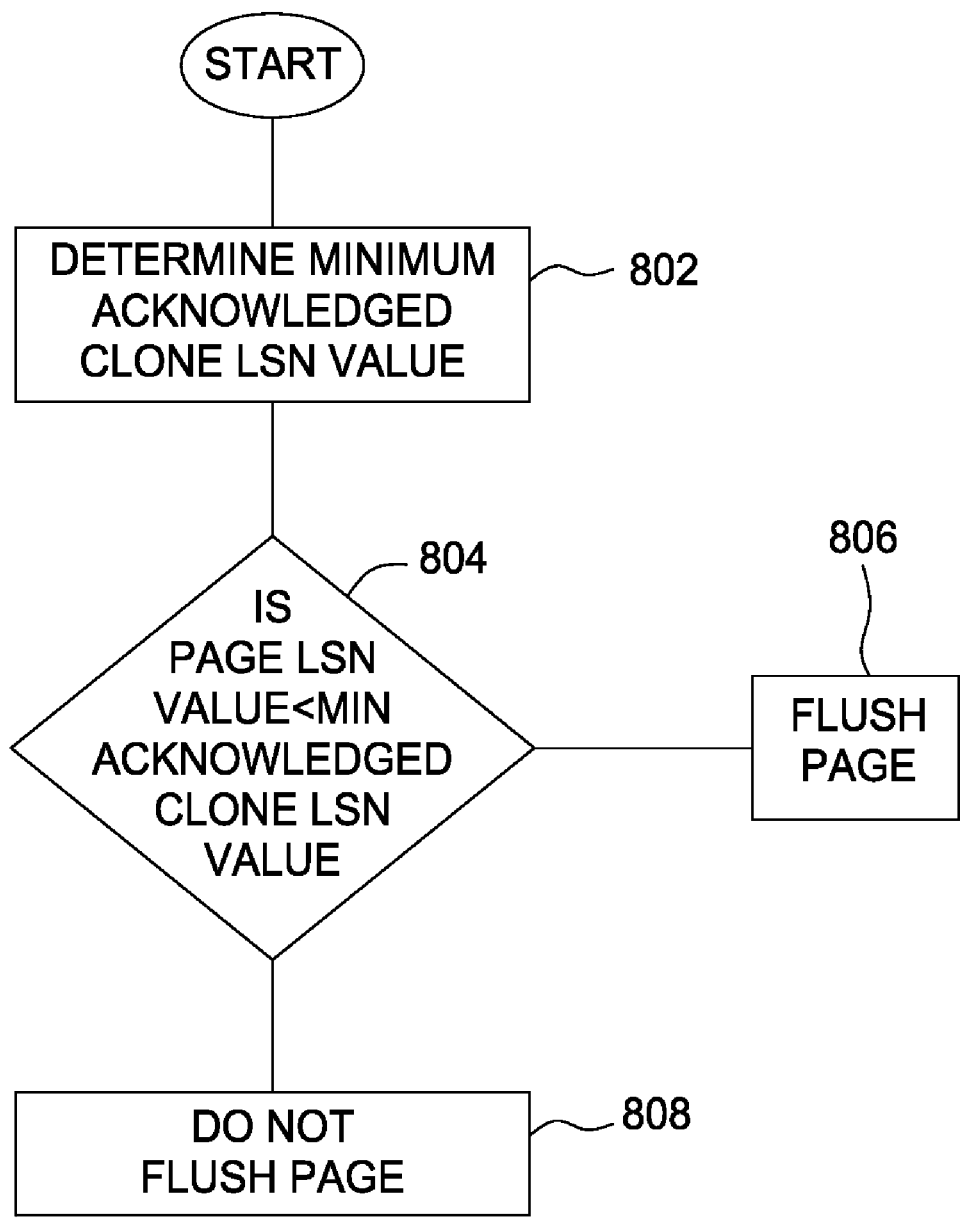
FIG. 8 is a flow diagram of exemplary operations performed by a primary server during log flushing, according to an embodiment of the invention.

FIG. 8 is a flow diagram of exemplary operations performed by a primary server 210 for flushing a dirty page in a page buffer. The operations may begin in step 802 by determining the minimum acknowledged clone LSN value. For example, the primary server 210 may access the clone control blocks 730 to determine the lowest LSN value acknowledged by the shared disk clones 230.

In step 802, primary server 210 may determine whether the lowest acknowledged LSN value is less than the page LSN value. If the lowest acknowledged LSN value is greater than the page LSN value, primary server 210 may flush the page to the shared disk 241 in step 806. If, however, the lowest acknowledged LSN value is not less than the page LSN value, the page may not be flushed in step 808.

As discussed above, shared disk clones 230 may not write to the shared disk 241, and therefore may generally not flush dirty pages to the shared disk. However, there may be some instances when a page flush from a shared disk clone 230 may be necessary. For example, if the page buffers at the shared disk clones become full, page flushing may be necessary. Some pages, for example, control pages may always be flushed by the shared disk clones 230. In one embodiment, shared disk clones may flush the control pages to a paging file maintained at the shared disk clone.

The probability of flushing from a shared disk clone 230 to the shared disk 241 may be reduced by requesting a checkpoint from the primary server 210 when the shared disk clone reaches a certain percentage of dirty pages. For example, each shared disk clone 230 may maintain a configuration parameter to establish a threshold percentage of dirty pages. If the percentage of dirty pages reaches the threshold set by the parameter, the shared disk clone 230 may send a request for a checkpoint to the primary server 210. In one embodiment, the checkpoint requested from the primary server 210 may be a non-blocking checkpoint.

In response to receiving a request for a checkpoint, primary server 210 may determine a checkpoint position in the log file. When the checkpoint is reached during log processing by the shared disk clones 230, the primary server 210 may flush dirty pages. In one embodiment of the invention, one or more paging files may be maintained on each shared disk clone to store pages being flushed by the primary server 210.

For example, in one embodiment, each shared disk clone 230 may maintain a current paging file and an old paging file. When a checkpoint is reached, the shared disk clone 230 may swap the current paging file and the old paging file. Any new pages accessed by the shared disk clone 230 may be stored in the current paging file. The old paging file may contain pages that are being flushed by the primary server 210 during checkpoint processing. Therefore, the shared disk clones 230 may still access the pages being flushed during checkpoint processing by storing them in the old paging file. Checkpoint processing at the shared disk clone 230 is discussed in greater detail in the following section.

Figure 9A:
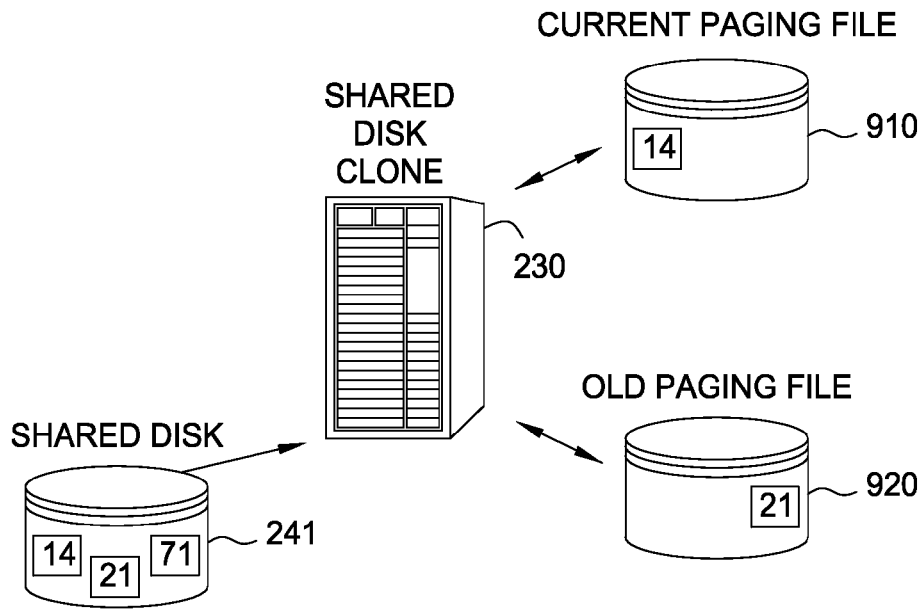
FIG. 9A-C are conceptual illustrations of log flushing performed by a shared disk clone, according to an embodiment of the invention.
Figure 9B:
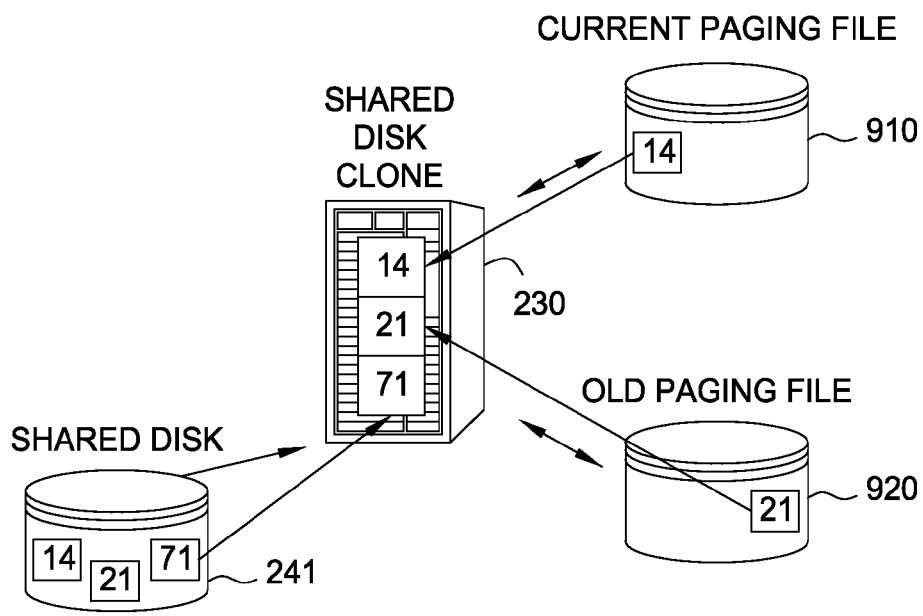
Figure 9C:
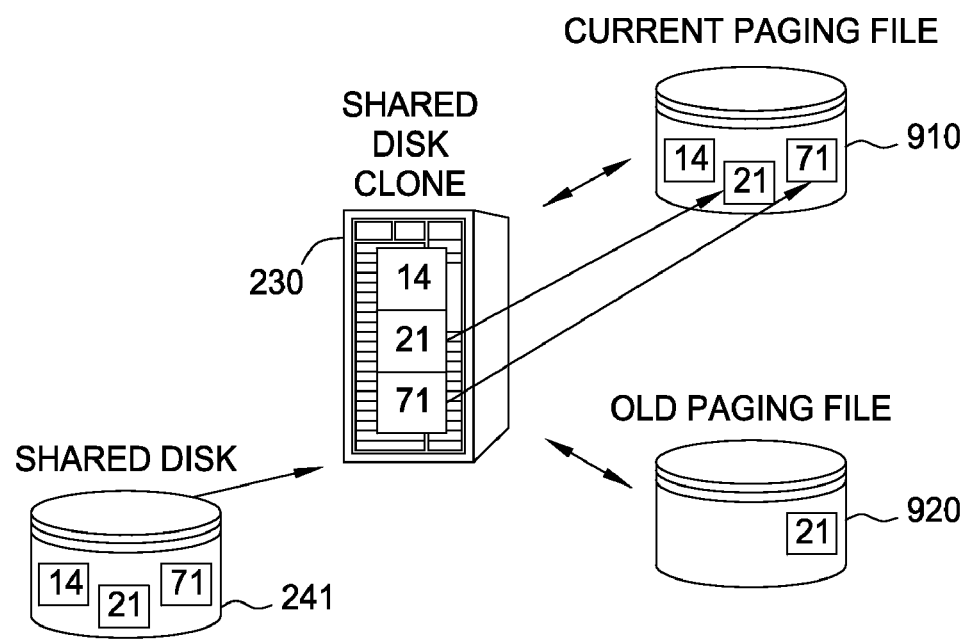

FIGS. 9A-C illustrate page access in one or more paging files by a shared disk clone, according to an embodiment of the invention. As shown, FIG. 9A illustrates the location of pages 14, 21, and 71. Specifically, pages 14, 21, and 71 may be present in the shared disk 241. Further, page 14 is stored in a current paging file 910, and page 21 is stored in an old paging file 920 of shared disk clone 230.

If a page is to be accessed, the shared disk clone may first check if the page is available in the current paging file. For example, if page 14 is to be accessed, shared disk clone 230 may first search for the page in the current paging file 910. Because page 14 is available in the current paging file 910, the page may be read therefrom.

If a page is not available in the current paging file 910, the shared disk clone 230 may search for the page in the old paging file 920. For example, if page 21 is to be accessed, shared disk clone 230 may search for page 21 in the current paging file 910. Because page 21 is not available in the current paging file 910, shared disk clone 230 may search for page 21 in the old paging file. In FIG. 9A, because page 21 is available in the old paging file 920, the page may be read therefrom.

If a page is not available in the current paging file 910 and the old paging file 920, the page may be read from the shared disk 241. For example, page 71 may be read from the shared disk 241 because page 71 is not available in the current paging file 910 and the old paging file 920.

FIG. 9B illustrates a shared disk clone 230 that has read page 14 from the current paging file 910, page 21 from the old paging file 920, and page 71 from the shared disk 241. If any one of pages 14, 21, and 71 are modified (dirtied) by the shared disk clone 230, the pages may be written to the current paging file 910. For example, page 21 and page 71 may be modified by the shared disk clone 230 during log processing. Because pages 21 and 71 are modified, shared disk clone 230 may store the modified pages 21 and 71 in the current paging file 910, as illustrated in FIG. 9C.

As discussed earlier, shared disk clone 230 may require page flushing and may request a checkpoint from the primary server 210 to facilitate page flushing. In response to receiving a request for a checkpoint, a primary server 210 may set a checkpoint position in the log file. When the checkpoint is encountered by the shared disk clone 230 during processing of the log file, the shared disk clone 230 may swap the current paging file 910 with the old paging file 920. The new current paging file 910 may then be truncated. As a result, the new current paging file 910 may be available to the shared disk clone to store dirtied pages. For example, any page flushes required after the start of checkpoint processing may be performed to the new current paging file 910.

Furthermore, the old paging file may contain pages that will ultimately be flushed to the shared disk 241 by the primary server 210. Therefore, the shared disk clone 230 may have access to the pages being flushed even during checkpoint processing by the primary server 210. For example, during checkpoint processing, the primary server 210 may write dirtied pages to the shared disk 241. Because flushing is not an atomic operation, it may not be possible to determine whether a dirtied page has been written to the shared disk 241 or not. Therefore, by storing the pages being flushed by the primary server 210 in the new old paging file 920, the shared disk clones may have access to the pages being flushed in case those pages need to be read.

After checkpoint processing is completed, primary server 210 may insert a checkpoint complete indication in the log file. When a shared disk clone 230 encounters the checkpoint complete indication in the log file, the shared disk clone 230 may flag the old paging file 920 to be truncated as soon as no thread references the old paging file 920. Furthermore, the page buffer at the shared disk clone 230 may also be scanned, and any page previously marked dirty for the just completed checkpoint interval is marked clean. Such pages may be marked clean because the pages may have been flushed to the shared disk 241 by the primary server 210. In other words, the shared disk clone need not flush the pages back to shared disk 241, as this operation is performed by the primary server 210. At the same time, once the shared disk clone 230 reaches a log entry indicating that the page has been flushed by the primary server 210, the clone 230 no longer needs to store that page in a buffer.

In one embodiment of the invention, a hash structure including page numbers may be used to determine which pages are contained in the paging files 910 and 920. During truncation of a paging file, memory contained in the hash array may simply be freed. Space may be allotted in a paging file based on the size of the page and the size of the next available space.

Figure 10:
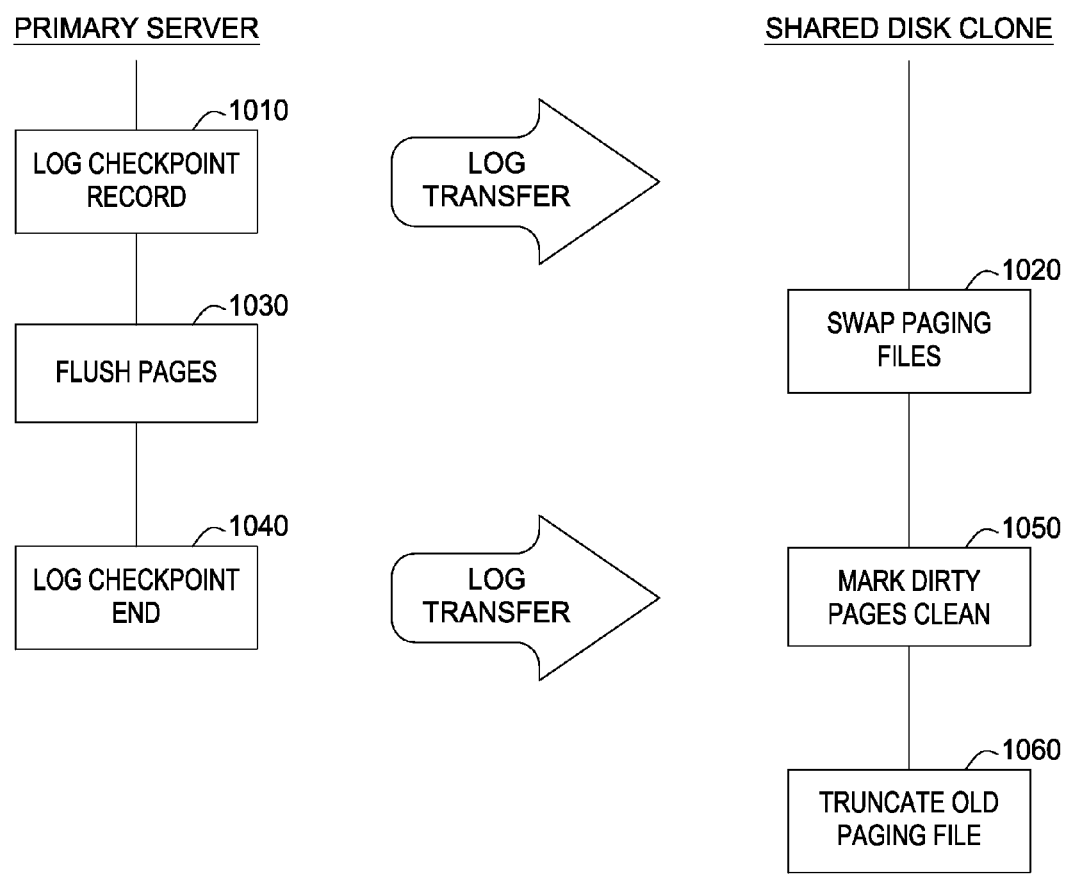
FIG. 10 illustrates exemplary operations performed by a primary server and a shared disk clone during checkpoint processing, according to an embodiment of the invention.

FIG. 10 illustrates exemplary checkpoint processing by the primary server 210 and shared disk clone 230, according to an embodiment of the invention. As shown, checkpoint processing may begin at step 1010 where the primary server 210 logs a checkpoint in the log file. This log entry may be read by the shared disk clone 230. When the checkpoint is encountered by the shared disk clone 230, the shared disk clone 230 may swap paging files in step 1020. For example, the shared disk clone 230 may swap the current paging file 910 with the old paging file 920. Shared disk clone 230 may also truncate the new current paging file as described above.

In step 1030, the primary server 210 flushes dirty pages to the shared disk 241. After the dirty pages have been flushed, the primary server 210 may log a checkpoint end in the log file in step 1040. This log entry may be read by the shared disk clone 230. When the shared disk clone 230 encounters the entry for the "checkpoint end" in the log file, the shared disk clone 230 may free dirty pages in step 1050. In step 1060, the shared disk clone 230 may truncate the old paging file once no threads running on the clone 230 reference the old paging file.

In one embodiment of the invention, if a page that is to be flushed is being updated at the primary server 210 during checkpoint processing, the primary server may write the page to the log file and mark the page as being flushed as part of the next checkpoint. To obviate shared disk clone 230 from accessing an incorrect version of the page in the shared disk 241, primary server 210 may ship the updated page to the shared disk clone 230 prior to sending it a new LSN value. When the physical log page is received by the shared disk clone 230, it may be placed in a page buffer and marked dirty.

Figure 11:
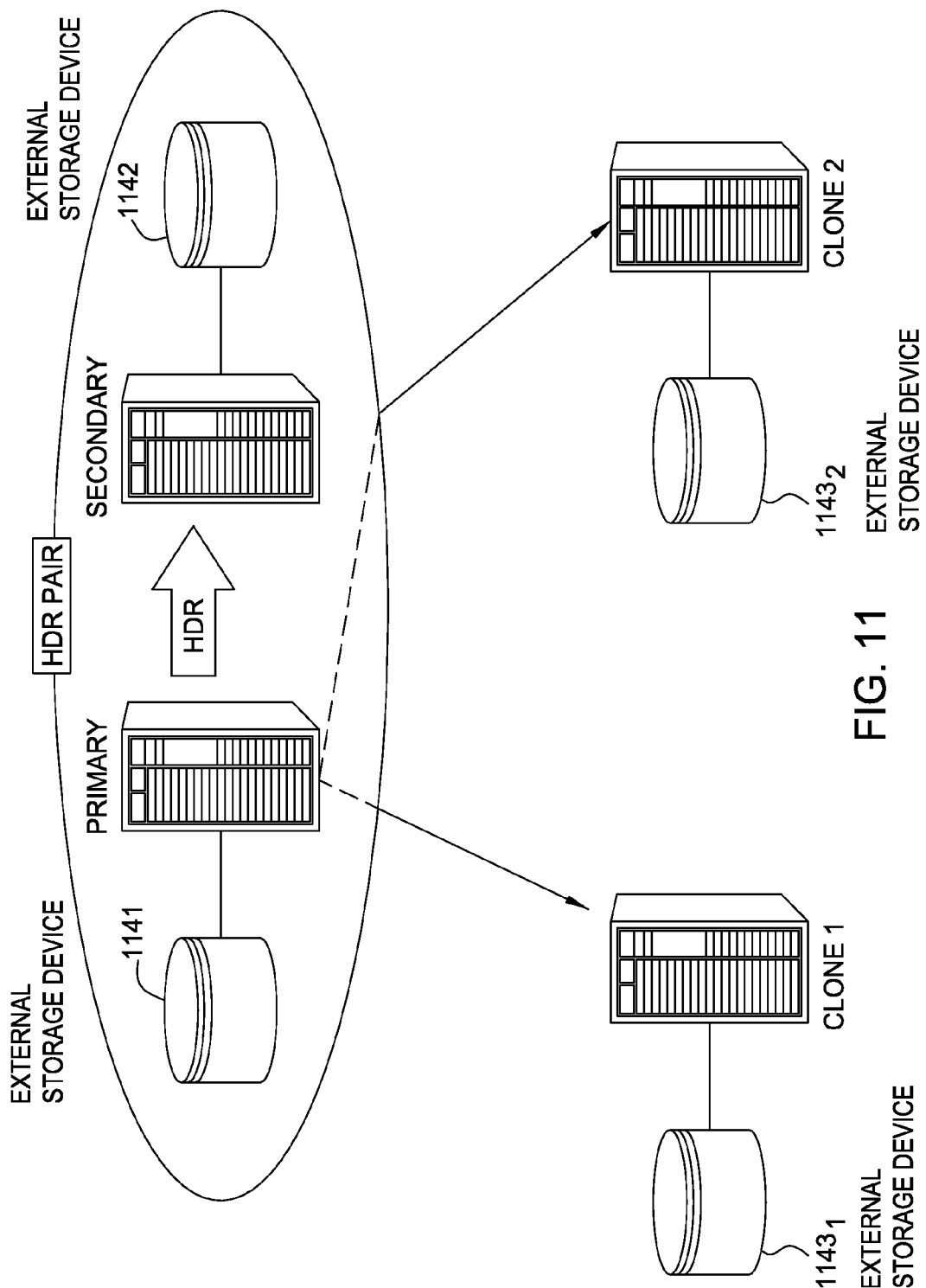
FIG. 11 illustrates an exemplary system comprising a High Availability Data Replication (HDR) clone, according to an embodiment of the invention.

FIG. 11 illustrates an exemplary system 1100 comprising HDR clones, according to an embodiment of the invention. As illustrated in FIG. 11, system 1100 may include a primary server 1110, a secondary server 1120, and one or more HDR clones 1130. Each of primary server 1110, secondary server 1120, and the HDR clones 1130 may have an associated external storage device. For example, primary server 1110 may have an associated external storage device 1141, secondary server 1120 may have an associated external storage device 1142, and the HDR clones 1130 may have associated external storage devices $1143_1$ and $1143_2$, as illustrated in FIG. 11.

As described earlier, each of the primary server, secondary server and the HDR clones may maintain a disk copy of a database, for example, in their respective external storage devices. The secondary server 1120 and the HDR clones 1130 may operate in recovery mode. Thus, secondary server 1120 and the HDR clones 1130 may be processing log entries corresponding to actions performed by the primary server. Primary server 1110 may monitor and control the processing of a log file by the secondary server 1120 and the HDR clones 1130 by shipping log entries to the secondary server 1120 and the HDR clones 1130.

In one embodiment of the invention, the secondary server 1120 and the HDR clones 1130 may be configured to perform dirty read report processing. In other words, each of the secondary server 1120 and the HDR clones 1130 may be configured to receive requests to read a database and access their respective external storage devices to service the read requests. However, the secondary server 1120 and the HDR clones 1130 may be configured as read-only, i.e., the HDR clones do not alter the contents of the database. In one embodiment of the invention, dirty read report processing may involve reading data which is not yet committed.

Primary server 1110 may be configured to maintain a tight relationship with the secondary server 1120 to ensure essentially synchronous processing of events in a log file. For example, primary server 1110 may be configured to receive log entries in a log buffer and transfer contents of the log buffer to the secondary server 1120. Primary server 1110 may also be configured to set checkpoints in a log file to track progress and synchronize log processing with the secondary server 1120.

However, the tight relationship between the primary server 1110 and the secondary server 1120 may result in performance cost which may be unacceptable. For example, if there is a great distance between the primary server 110 and the secondary server 1120 and/or if the primary server 110 and the secondary server 1120 are connected over a noisy network, the communication delays between the primary server and secondary server 1120 may be unacceptable. Furthermore, in some instances, it may be desirable to have more than one system in recovery mode. Including more than one secondary server 1120 may further increase the performance cost.

Advantageously, embodiments of the invention provide for 1-N HDR clones 1130 to be used to overcome these drawbacks associated with the secondary server 1120 (i.e., a tightly coupled HDR primary and secondary pair). For example, in one embodiment, log processing at the HDR clones 1130 may be allowed to lag behind log processing at the primary server 1110. Therefore, the primary server 1110 need not set checkpoints and synchronize log processing with the HDR clones 1130, thereby minimizing the amount of communication needed between the primary server 1110 and the HDR clones 1130. Furthermore, because a tight relationship is not maintained between the primary server 1110 and the HDR clones 1130, a plurality of HDR clones 1130 may be coupled with the primary server 1110 without significantly affecting performance.

As discussed above, the interface between the primary server 1110 and the HDR clones 1130 may be relatively simple because the primary server 1110 need not maintain the essentially synchronous processing of the log file with the HDR clones 1130 (unlike the relationship between the primary server 110 and the secondary server 1120). Therefore, log pages may be shipped by the primary server 1110 to an HDR clone 1130 for lagged processing.

In one embodiment of the invention, as was the case with primary server 210, primary server 1110 may also maintain clone control blocks for each HDR clone 1130 in a main kernel control block at the primary server 1110. Primary server 1110 may also maintain a log buffer comprising a plurality of log pages. If a log buffer becomes full, primary server 1110 may be configured to flush one or more pages in the log buffer to the external storage device 1141.

In one embodiment, when the log buffer is flushed to an external storage device 1141 associated with the primary server 1110, a scan of the clone control blocks in the main kernel control block of the primary server 1110 may be made. One or more pages of the log buffer may be copied into the clone control block of each of the HDR clones 1130 if adequate space is available. The clone control blocks may then send the log buffer page to an associated HDR clone over the network coupling the primary server 1110 and the HDR clones 1130, for example, over a TSGC network.

Figure 12:
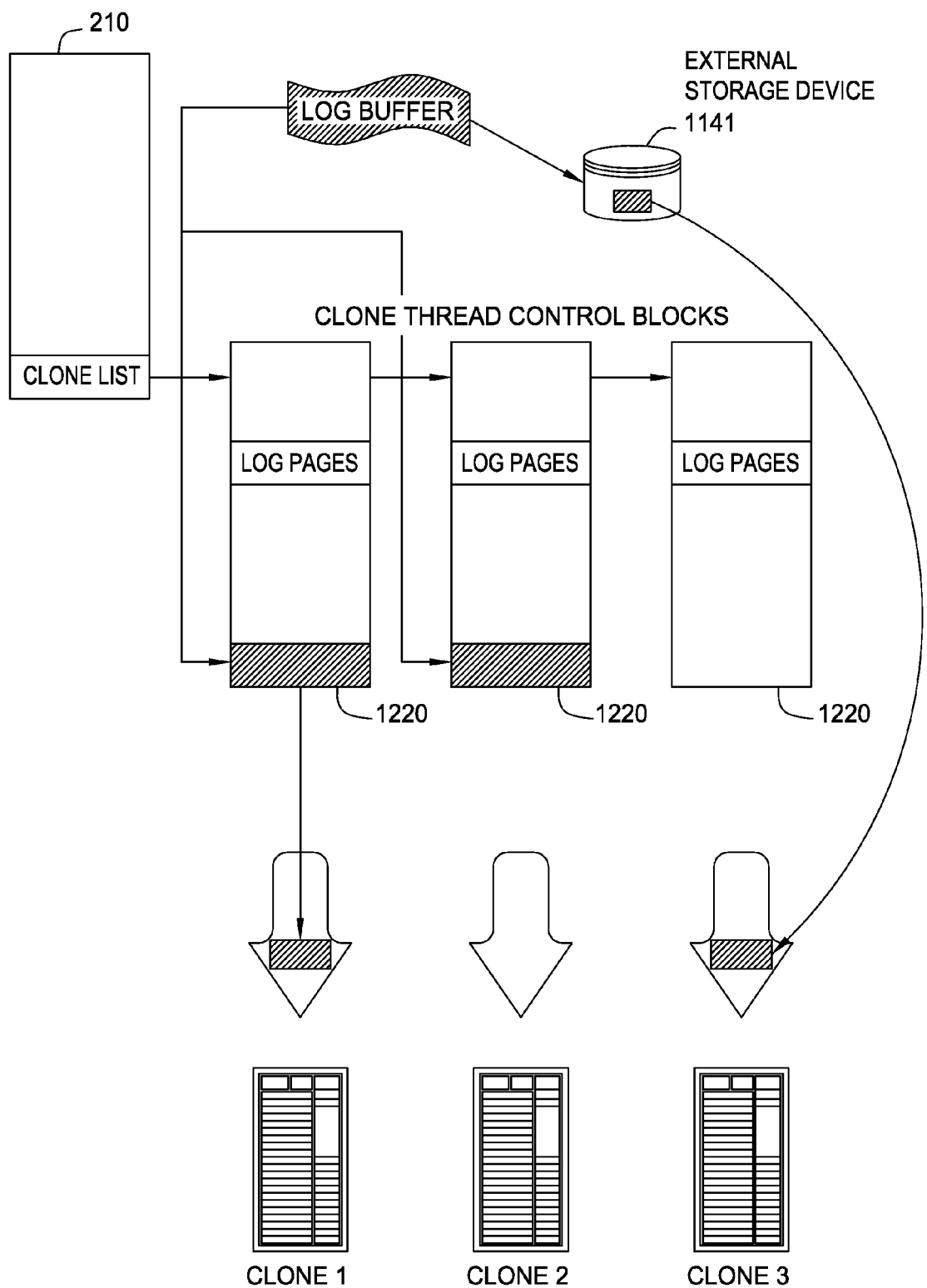
FIG. 12 illustrates log transfers to HDR clones, according to an embodiment of the invention.

FIG. 12 illustrates log shipping from the primary server 1110 to the HDR clones 1130, according to an embodiment of the invention. As shown, primary server 1110 includes a main kernel control block 1210. Kernel control block 1210 may also a clone control blocks 1220 for each HDR clone coupled with the primary server 1110. Each clone control block 1220 may be configured to send one or more log pages 1222 contained in an associated clone control block 1220 to a respective HDR clone 1130.

For example, when a log page is flushed by the primary server 1110 to an external storage device 1141, primary server 1110 may examine the clone control blocks 1220 to determine whether the clone control block for an HDR clone includes a free log buffer page. The log buffer may be configured to store pages of log entries shipped from the primary server 1110 to the HDR clones. As the log entries are processed by the HDR clones, the pages are marked as available. If a free log buffer page is available in a clone control block, the page that is to be flushed may be copied into the free log buffer page. Clone control block 1220 may then send the page to an associated HDR clone 1130.

In one embodiment, if no free log buffer pages are available in a clone control block, a page from the log buffer may be flushed to the external storage device 1141. In such case, clone control blocks 1220 may be configured to access the page in the external storage device 1141 directly and send the log page to the HDR clone when appropriate. Further, if the primary server 1110 is coupled with a secondary server 1120, primary server 1110 may first determine whether a log page has already been sent to the secondary server 1120 before transferring the log page to the HDR clone 1130. By waiting until the secondary server 1120 has received a log page, primary server 1110 may ensure that the HDR clone may continue to function normally if the secondary server 1120 is promoted to the status of primary server.

As stated, the primary server 1110 may be configured to issue non-blocking checkpoints on the HDR clones to provide a point of recovery on the HDR clones. By issuing non-blocking checkpoints log processing at the primary server 1110 may continue uninterrupted during checkpoint processing. Because a tight relationship is not maintained between the primary server 1110 and the HDR clones 1130, the non blocking checkpoints may be placed at relatively large intervals. For example, in a particular embodiment, primary server 1110 may be configured to issue a non-blocking checkpoint after a third of the way through the log file after the last issued checkpoint. Therefore, at least 3 non-blocking checkpoints may be issued for each log cycle.

Additionally, the HDR clone 1130 may be configured to request a non-blocking checkpoint when a pre-defined condition occurs. For example, as discussed earlier with respect to the shared disk clones, a non-blocking checkpoint may be issued by HDR clone 1130 if the number of dirty pages at the HDR clone 1130 reaches a threshold value.

In one embodiment, a shared disk clone or a HDR clone may be elevated to the status of either one of a primary server or a secondary server. For example, if a primary server or a secondary server fails, one of the shared disk clones or the HDR clone may be elevated to the status of the primary server or the secondary server.

Advantageously, by allowing a clone computer to share an external storage deceive with a primary server embodiments of the invention provide high availability and reliability while efficiently using resources of a system. Furthermore, by allowing processing of a log file at the clone to lag behind the processing of the log file at the primary server, performance of the system may be improved by reducing communication costs. In some embodiments, one or more clone computers may be implemented with their own respective storage to provide additional backup in case of a double failure.

While the foregoing is directed to embodiments of the present invention, other and further embodiments of the invention may be devised without departing from the basic scope thereof, and the scope thereof is determined by the claims that follow.

What is claimed is:

1. A computer-implemented method, comprising:
providing a primary database server and a clone of the primary database server to shadow database processing actions performed by the primary database server, wherein both the primary database server and the clone have access to a shared storage device;
sharing access from the primary database server and the clone to database pages stored on the shared storage device and access to a log file that stores entries corresponding to a sequence of database processing actions performed by the primary database server;
receiving a first log sequence number (LSN) representing an entry in the sequence of database processing actions;
reading the log file to retrieve the log entries in the log file sequentially prior to the entry represented by the first LSN;
performing at least some of the sequence of database processing actions specified by the log entries, wherein the performing includes retrieving at least one database page from the database pages;
storing the at least one database page in a page buffer on the clone; and
sending a message to the primary database server that includes a second LSN specifying a last log entry processed by the clone, wherein the primary database server is configured to flush pages from a page buffer on the primary database server to the shared storage device based upon how far the clone has progressed through the sequence of database processing actions specified by the log entries.

2. The method of claim 1, further comprising, upon determining the primary database server has failed, promoting the clone to replace the primary database server.

3. The method of claim 1, wherein the primary database server is further configured to flush a modified copy of the first database page from the cache on the primary database server to the shared storage device; and
upon determining, using the second LSN, that the clone has pulled an unmodified copy of the first database page into the page buffer maintained by the clone, flushing the modified copy of the first database page to the shared storage device.

4. The method of claim 1, wherein the shared storage device is a storage array network (SAN).

5. The method of claim 1, wherein the clone is configured to request the primary database server perform a checkpoint operation whenever a number of database pages in the page buffer reaches a predetermined threshold.

6. The method of claim 1, wherein the primary database server is further configured to store a checkpoint entry in the log file, and when the clone reaches the checkpoint while performing the sequence of database processing actions specified by the log entries, flushing database pages from the page buffer on the primary database server to the shared storage device.

7. The method of claim 6, wherein the clone is configured to maintain a first paging file and a second paging file, wherein the first paging file stores a list of pages dirtied by the clone and the second paging file stores a list of dirty pages being flushed to the shared storage device by the primary server.

8. The method of claim 7, further comprising swapping the first paging file and the second paging file when the clone reaches the checkpoint in the log file.

9. The method of claim 1, wherein the primary database server is further configured to transfer the log file to at least one high availability data replication (HDR) clone, the HDR clone having an associated storage device, the associated storage device comprising a copy of the database accessed by the primary server.

10. A computer-readable storage medium containing a program which, when executed, performs an operation comprising:
providing a primary database server and a clone of the primary database server to shadow database processing actions performed by the primary database server, wherein both the primary database server and the clone have access to a shared storage device;
sharing access from the primary database server and the clone to database pages stored on the shared storage device and access to a log file that stores entries corresponding to a sequence of database processing actions performed by the primary database server;
receiving a first log sequence number (LSN) representing an entry in the sequence of database processing actions;
reading the log file to retrieve the log entries in the log file sequentially prior to the entry represented by the first LSN;
performing at least some of the sequence of database processing actions specified by the log entries, wherein the performing includes retrieving at least one database page from the database pages;

storing the at least one database page in a page buffer on the clone; and sending a message to the primary database server that includes a second LSN specifying a last log entry processed by the clone, wherein the primary database server is configured to flush pages from a page buffer on the primary database server to the shared storage device based upon how far the clone has progressed through the sequence of database processing actions specified by the log entries.

11. The computer-readable storage medium of claim 10, wherein the operation further comprises, upon determining the primary database server has failed, promoting the clone to replace the primary database server.

12. The computer-readable storage medium of claim 10, wherein the primary database server is further configured to flush a modified copy of the first database page from the cache on the primary database server to the shared storage device; and upon determining, using the second LSN, that the clone has pulled an unmodified copy of the first database page into the page buffer maintained by the clone, flushing the modified copy of the first database page to the shared storage device.

13. The computer-readable storage medium of claim 10, wherein the shared storage device is a storage array network (SAN).

14. The computer-readable storage medium of claim 10, wherein the clone is configured to request the primary database server perform a checkpoint operation whenever a number of database pages in the page buffer reaches a predetermined threshold.

15. The computer-readable storage medium of claim 10, wherein the primary database server is further configured to store a checkpoint entry in the log file, and when the clone reaches the checkpoint while performing the sequence of database processing actions specified by the log entries, flushing database pages from the page buffer on the primary database server to the shared storage device.

16. The computer-readable storage medium of claim 15, wherein the clone is configured to maintain a first paging file and a second paging file, wherein the first paging file stores a list of pages dirtied by the clone and the second paging file stores a list of dirty pages being flushed to the shared storage device by the primary server.

17. The computer-readable storage medium of claim 16, wherein the operation further comprises, swapping the first paging file and the second paging file when the clone reaches the checkpoint in the log file.

18. The computer-readable storage medium of claim 10, wherein the primary database server is further configured to transfer the log file to at least one high availability data replication (HDR) clone, the HDR clone having an associated storage device, the associated storage device comprising a copy of the database accessed by the primary server.

19. A computing device, comprising:
a processor;
a shared storage device; and
a memory containing a program, which when executed on the processor, performs an operation comprising:
providing a primary database server and a clone of the primary database server to shadow database processing actions performed by the primary database server, wherein both the primary database server and the clone have access to a shared storage device;
sharing access from the primary database server and the clone to database pages stored on the shared storage device and access to a log file that stores entries corresponding to a sequence of database processing actions performed by the primary database server,
receiving a first log sequence number (LSN) representing an entry in the sequence of database processing actions,
reading the log file to retrieve the log entries in the log file sequentially prior to the entry represented by the first LSN,
performing at least some of the sequence of database processing actions specified by the log entries, wherein the performing includes retrieving at least one database page from the database pages;
storing the at least one database page in a page buffer on the clone, and
sending a message to the primary database server that includes a second LSN specifying a last log entry processed by the clone, wherein the primary database server is configured to flush pages from a page buffer on the primary database server to the shared storage device based upon how far the clone has progressed through the sequence of database processing actions specified by the log entries.

20. The computing device of claim 19, wherein the operation further comprises, upon determining the primary database server has failed, promoting the clone to replace the primary database server.

21. The computing device of claim 19, wherein the primary database server is further configured to flush a modified copy of the first database page from the cache on the primary database server to the shared storage device; and upon determining, using the second LSN, that the clone has pulled an unmodified copy of the first database page into the page buffer maintained by the clone, flushing the modified copy of the first database page to the shared storage device.

22. The computing device of claim 19, wherein the shared storage device is a storage array network (SAN).

23. The computing device of claim 19, wherein the clone is configured to request the primary database server perform a checkpoint operation whenever a number of database pages in the page buffer reaches a predetermined threshold.

24. The computing device of claim 19, wherein the primary database server is further configured to store a checkpoint entry in the log file, and when the clone reaches the checkpoint while performing the sequence of database processing actions specified by the log entries, flushing database pages from the page buffer on the primary database server to the shared storage device.

25. The computing device of claim 24, wherein the clone is configured to maintain a first paging file and a second paging file, wherein the first paging file stores a list of pages dirtied by the clone and the second paging file stores a list of dirty pages being flushed to the shared storage device by the primary server.

26. The computing device of claim 25, wherein the operation further comprises, swapping the first paging file and the second paging file when the clone reaches the checkpoint in the log file.

27. The computing device of claim 19, wherein the primary database server is further configured to transfer the log file to at least one high availability data replication (HDR) clone, the HDR clone having an associated storage device, the associated storage device comprising a copy of the database accessed by the primary server.

* * * * *